(12) United States Patent
Hashigami

(10) Patent No.: US 7,848,467 B2
(45) Date of Patent: Dec. 7, 2010

(54) SIGNAL PROCESSING SYSTEM IN WIRELESS MOBILE COMMUNICATION SYSTEM

(75) Inventor: Takahito Hashigami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 748 days.

(21) Appl. No.: 11/508,644

(22) Filed: Aug. 23, 2006

(65) Prior Publication Data

US 2007/0274216 A1 Nov. 29, 2007

(30) Foreign Application Priority Data

May 26, 2006 (JP) .............................. 2006-147287

(51) Int. Cl.
*H03D 1/04* (2006.01)
*H04B 1/66* (2006.01)

(52) U.S. Cl. .................... 375/346; 375/240; 370/235

(58) Field of Classification Search ............... 375/346, 375/316; 370/235
See application file for complete search history.

(56) References Cited

U.S. PATENT DOCUMENTS 6,727,821 B2 * 4/2004 Weekes et al. .............. 340/588

| | | | |
|---|---|---|---|
| 2004/0009773 A1 | 1/2004 | Kato | |
| 2004/0235428 A1* | 11/2004 | Nagai et al. | 455/85 |
| 2005/0176439 A1* | 8/2005 | Sasaki | 455/450 |
| 2006/0073837 A1 | 4/2006 | Tanaka et al. | |

FOREIGN PATENT DOCUMENTS

| JP | 2004-48209 | 2/2004 |
|---|---|---|
| JP | 2006-87019 | 3/2006 |

OTHER PUBLICATIONS

European Search Report dated Sep. 5, 2007, from the corresponding European Application.
Communication pursuant to Article 94(3) EPC from corresponding European Application No. 06 254 371.5, Sep. 6, 2010.

* cited by examiner

*Primary Examiner*—David C Payne
*Assistant Examiner*—Brian J Stevens
(74) *Attorney, Agent, or Firm*—Katten Muchin Rosenman LLP

(57) ABSTRACT

In a wireless mobile communication system, functions of a base transceiver station is divided and served by transmission/reception devices for communicating with mobile stations, and a signal processing device for performing base band signal processes of a plurality of channels. A plurality of transmission/reception devices and a plurality of signal processing devices are connected via a communication network. Thereby, connection relationships among the transmission/reception devices and the signal processing devices can be flexibly changed.

3 Claims, 9 Drawing Sheets

| | ITEM | IP ADDRESS | | | |
|---|---|---|---|---|---|
| | RNC | 10 | 34 | 167 | 1 |
| MDE1 | CP/SV | 10 | 34 | 167 | 2 |
| | MODEM1 | 10 | 34 | 167 | 3 |
| | MODEM2 | 10 | 34 | 167 | 4 |
| | MODEM3 | 10 | 34 | 167 | 5 |
| | MODEM4 | 10 | 34 | 167 | 6 |
| | MODEM5 | 10 | 34 | 167 | 7 |
| | MODEM6 | 10 | 34 | 167 | 8 |
| | MODEM7 | 10 | 34 | 167 | 9 |
| | MODEM8 | 10 | 34 | 167 | 10 |
| | MODEM9 | 10 | 34 | 167 | 11 |
| | MODEM10 | 10 | 34 | 167 | 12 |
| | MODEM11 | 10 | 34 | 167 | 13 |
| | MODEM12 | 10 | 34 | 167 | 14 |
| | MODEM13 | 10 | 34 | 167 | 15 |
| | MODEM14 | 10 | 34 | 167 | 16 |
| | MODEM15 | 10 | 34 | 167 | 17 |
| | MODEM16 | 10 | 34 | 167 | 18 |
| | MODEM17 | 10 | 34 | 167 | 19 |
| | MODEM18 | 10 | 34 | 167 | 20 |
| | MODEM19 | 10 | 34 | 167 | 21 |
| | MODEM20 | 10 | 34 | 167 | 22 |
| | MODEM21 | 10 | 34 | 167 | 23 |
| | MODEM22 | 10 | 34 | 167 | 24 |
| | MODEM23 | 10 | 34 | 167 | 25 |
| | MODEM24 | 10 | 34 | 167 | 26 |
| MDE2 | CP/SV | 10 | 34 | 167 | 27 |
| | MODEM1 | 10 | 34 | 167 | 28 |
| | MODEM2 | 10 | 34 | 167 | 29 |
| | MODEM3 | 10 | 34 | 167 | 30 |
| | MODEM4 | 10 | 34 | 167 | 31 |
| | MODEM5 | 10 | 34 | 167 | 32 |
| | MODEM6 | 10 | 34 | 167 | 33 |
| | MODEM7 | 10 | 34 | 167 | 34 |
| | MODEM8 | 10 | 34 | 167 | 35 |
| | MODEM9 | 10 | 34 | 167 | 36 |
| | MODEM10 | 10 | 34 | 167 | 37 |
| | MODEM11 | 10 | 34 | 167 | 38 |
| | MODEM12 | 10 | 34 | 167 | 39 |
| | MODEM13 | 10 | 34 | 167 | 40 |
| | MODEM14 | 10 | 34 | 167 | 41 |
| | MODEM15 | 10 | 34 | 167 | 42 |
| | MODEM16 | 10 | 34 | 167 | 43 |
| | MODEM17 | 10 | 34 | 167 | 44 |
| | MODEM18 | 10 | 34 | 167 | 45 |
| | MODEM19 | 10 | 34 | 167 | 46 |
| | MODEM20 | 10 | 34 | 167 | 47 |
| | MODEM21 | 10 | 34 | 167 | 48 |
| | MODEM22 | 10 | 34 | 167 | 49 |
| | MODEM23 | 10 | 34 | 167 | 50 |
| | MODEM24 | 10 | 34 | 167 | 51 |
| MDE3 | CP/SV | 10 | 34 | 167 | 52 |
| | MODEM1 | 10 | 34 | 167 | 53 |
| | MODEM2 | 10 | 34 | 167 | 54 |
| | MODEM3 | 10 | 34 | 167 | 55 |
| | MODEM4 | 10 | 34 | 167 | 56 |
| | MODEM5 | 10 | 34 | 167 | 57 |
| | MODEM6 | 10 | 34 | 167 | 58 |
| | MODEM7 | 10 | 34 | 167 | 59 |
| | MODEM8 | 10 | 34 | 167 | 60 |
| | MODEM9 | 10 | 34 | 167 | 61 |
| | MODEM10 | 10 | 34 | 167 | 62 |
| | MODEM11 | 10 | 34 | 167 | 63 |
| | MODEM12 | 10 | 34 | 167 | 64 |
| | MODEM13 | 10 | 34 | 167 | 65 |
| | MODEM14 | 10 | 34 | 167 | 66 |
| | MODEM15 | 10 | 34 | 167 | 67 |
| | MODEM16 | 10 | 34 | 167 | 68 |
| | MODEM17 | 10 | 34 | 167 | 69 |
| | MODEM18 | 10 | 34 | 167 | 70 |
| | MODEM19 | 10 | 34 | 167 | 71 |
| | MODEM20 | 10 | 34 | 167 | 72 |
| | MODEM21 | 10 | 34 | 167 | 73 |
| | MODEM22 | 10 | 34 | 167 | 74 |
| | MODEM23 | 10 | 34 | 167 | 75 |
| | MODEM24 | 10 | 34 | 167 | 76 |
| MDE4 | CP/SV | 10 | 34 | 167 | 77 |
| | MODEM1 | 10 | 34 | 167 | 78 |
| | MODEM2 | 10 | 34 | 167 | 79 |
| | MODEM3 | 10 | 34 | 167 | 80 |
| | MODEM4 | 10 | 34 | 167 | 81 |
| | MODEM5 | 10 | 34 | 167 | 82 |
| | MODEM6 | 10 | 34 | 167 | 83 |
| | MODEM7 | 10 | 34 | 167 | 84 |

| | | ITEM | IP ADDRESS | | | |
|---|---|---|---|---|---|---|
| MDE4 | | MODEM8 | 10 | 34 | 167 | 85 |
| | | MODEM9 | 10 | 34 | 167 | 86 |
| | | MODEM10 | 10 | 34 | 167 | 87 |
| | | MODEM11 | 10 | 34 | 167 | 88 |
| | | MODEM12 | 10 | 34 | 167 | 89 |
| | | MODEM13 | 10 | 34 | 167 | 90 |
| | | MODEM14 | 10 | 34 | 167 | 91 |
| | | MODEM15 | 10 | 34 | 167 | 92 |
| | | MODEM16 | 10 | 34 | 167 | 93 |
| | | MODEM17 | 10 | 34 | 167 | 94 |
| | | MODEM18 | 10 | 34 | 167 | 95 |
| | | MODEM19 | 10 | 34 | 167 | 96 |
| | | MODEM20 | 10 | 34 | 167 | 97 |
| | | MODEM21 | 10 | 34 | 167 | 98 |
| | | MODEM22 | 10 | 34 | 167 | 99 |
| | | MODEM23 | 10 | 34 | 167 | 100 |
| | | MODEM24 | 10 | 34 | 167 | 101 |
| TRX GROUP1 | IP-TRX1 | CP/SV | 10 | 34 | 167 | 102 |
| | | C1 | 10 | 34 | 167 | 103 |
| | | C2 | 10 | 34 | 167 | 104 |
| | | C3 | 10 | 34 | 167 | 105 |
| | | C4 | 10 | 34 | 167 | 106 |
| | IP-TRX2 | CP/SV | 10 | 34 | 167 | 107 |
| | | C1 | 10 | 34 | 167 | 108 |
| | | C2 | 10 | 34 | 167 | 109 |
| | | C3 | 10 | 34 | 167 | 110 |
| | | C4 | 10 | 34 | 167 | 111 |
| | IP-TRX3 | CP/SV | 10 | 34 | 167 | 112 |
| | | C1 | 10 | 34 | 167 | 113 |
| | | C2 | 10 | 34 | 167 | 114 |
| | | C3 | 10 | 34 | 167 | 115 |
| | | C4 | 10 | 34 | 167 | 116 |
| | IP-TRX4 | CP/SV | 10 | 34 | 167 | 117 |
| | | C1 | 10 | 34 | 167 | 118 |
| | | C2 | 10 | 34 | 167 | 119 |
| | | C3 | 10 | 34 | 167 | 120 |
| | | C4 | 10 | 34 | 167 | 121 |
| | IP-TRX5 | CP/SV | 10 | 34 | 167 | 122 |
| | | C1 | 10 | 34 | 167 | 123 |
| | | C2 | 10 | 34 | 167 | 124 |
| | | C3 | 10 | 34 | 167 | 125 |
| | | C4 | 10 | 34 | 167 | 126 |
| | IP-TRX6 | CP/SV | 10 | 34 | 167 | 127 |
| | | C1 | 10 | 34 | 167 | 128 |
| | | C2 | 10 | 34 | 167 | 129 |
| | | C3 | 10 | 34 | 167 | 130 |
| | | C4 | 10 | 34 | 167 | 131 |
| TRX GROUP2 | IP-TRX1 | CP/SV | 10 | 34 | 167 | 132 |
| | | C1 | 10 | 34 | 167 | 133 |
| | | C2 | 10 | 34 | 167 | 134 |
| | | C3 | 10 | 34 | 167 | 135 |
| | | C4 | 10 | 34 | 167 | 136 |
| | IP-TRX2 | CP/SV | 10 | 34 | 167 | 137 |
| | | C1 | 10 | 34 | 167 | 138 |
| | | C2 | 10 | 34 | 167 | 139 |
| | | C3 | 10 | 34 | 167 | 140 |
| | | C4 | 10 | 34 | 167 | 141 |
| | IP-TRX3 | CP/SV | 10 | 34 | 167 | 142 |
| | | C1 | 10 | 34 | 167 | 143 |
| | | C2 | 10 | 34 | 167 | 144 |
| | | C3 | 10 | 34 | 167 | 145 |
| | | C4 | 10 | 34 | 167 | 146 |
| | IP-TRX4 | CP/SV | 10 | 34 | 167 | 147 |
| | | C1 | 10 | 34 | 167 | 148 |
| | | C2 | 10 | 34 | 167 | 149 |
| | | C3 | 10 | 34 | 167 | 150 |
| | | C4 | 10 | 34 | 167 | 151 |
| | IP-TRX5 | CP/SV | 10 | 34 | 167 | 152 |
| | | C1 | 10 | 34 | 167 | 153 |
| | | C2 | 10 | 34 | 167 | 154 |
| | | C3 | 10 | 34 | 167 | 155 |
| | | C4 | 10 | 34 | 167 | 156 |
| | IP-TRX6 | CP/SV | 10 | 34 | 167 | 157 |
| | | C1 | 10 | 34 | 167 | 158 |
| | | C2 | 10 | 34 | 167 | 159 |
| | | C3 | 10 | 34 | 167 | 160 |
| | | C4 | 10 | 34 | 167 | 161 |
| TRX GROUP3 | IP-TRX1 | CP/SV | 10 | 34 | 167 | 162 |
| | | C1 | 10 | 34 | 167 | 163 |
| | | C2 | 10 | 34 | 167 | 164 |
| | | C3 | 10 | 34 | 167 | 165 |
| | | C4 | 10 | 34 | 167 | 166 |
| | IP-TRX2 | CP/SV | 10 | 34 | 167 | 167 |
| | | C1 | 10 | 34 | 167 | 168 |

| | | ITEM | IP ADDRESS | | | |
|---|---|---|---|---|---|---|
| TRX GROUP3 | IP-TRX2 | C2 | 10 | 34 | 167 | 169 |
| | | C3 | 10 | 34 | 167 | 170 |
| | | C4 | 10 | 34 | 167 | 171 |
| | IP-TRX3 | CP/SV | 10 | 34 | 167 | 172 |
| | | C1 | 10 | 34 | 167 | 173 |
| | | C2 | 10 | 34 | 167 | 174 |
| | | C3 | 10 | 34 | 167 | 175 |
| | | C4 | 10 | 34 | 167 | 176 |
| | IP-TRX4 | CP/SV | 10 | 34 | 167 | 177 |
| | | C1 | 10 | 34 | 167 | 178 |
| | | C2 | 10 | 34 | 167 | 179 |
| | | C3 | 10 | 34 | 167 | 180 |
| | | C4 | 10 | 34 | 167 | 181 |
| | IP-TRX5 | CP/SV | 10 | 34 | 167 | 182 |
| | | C1 | 10 | 34 | 167 | 183 |
| | | C2 | 10 | 34 | 167 | 184 |
| | | C3 | 10 | 34 | 167 | 185 |
| | | C4 | 10 | 34 | 167 | 186 |
| | IP-TRX6 | CP/SV | 10 | 34 | 167 | 187 |
| | | C1 | 10 | 34 | 167 | 188 |
| | | C2 | 10 | 34 | 167 | 189 |
| | | C3 | 10 | 34 | 167 | 190 |
| | | C4 | 10 | 34 | 167 | 191 |
| TRX GROUP4 | IP-TRX1 | CP/SV | 10 | 34 | 167 | 192 |
| | | C1 | 10 | 34 | 167 | 193 |
| | | C2 | 10 | 34 | 167 | 194 |
| | | C3 | 10 | 34 | 167 | 195 |
| | | C4 | 10 | 34 | 167 | 196 |
| | IP-TRX2 | CP/SV | 10 | 34 | 167 | 197 |
| | | C1 | 10 | 34 | 167 | 198 |
| | | C2 | 10 | 34 | 167 | 199 |
| | | C3 | 10 | 34 | 167 | 200 |
| | | C4 | 10 | 34 | 167 | 201 |
| | IP-TRX3 | CP/SV | 10 | 34 | 167 | 202 |
| | | C1 | 10 | 34 | 167 | 203 |
| | | C2 | 10 | 34 | 167 | 204 |
| | | C3 | 10 | 34 | 167 | 205 |
| | | C4 | 10 | 34 | 167 | 206 |
| | IP-TRX4 | CP/SV | 10 | 34 | 167 | 207 |
| | | C1 | 10 | 34 | 167 | 208 |
| | | C2 | 10 | 34 | 167 | 209 |
| | | C3 | 10 | 34 | 167 | 210 |
| | | C4 | 10 | 34 | 167 | 211 |
| | IP-TRX5 | CP/SV | 10 | 34 | 167 | 212 |
| | | C1 | 10 | 34 | 167 | 213 |
| | | C2 | 10 | 34 | 167 | 214 |
| | | C3 | 10 | 34 | 167 | 215 |
| | | C4 | 10 | 34 | 167 | 216 |
| | IP-TRX6 | CP/SV | 10 | 34 | 167 | 217 |
| | | C1 | 10 | 34 | 167 | 218 |
| | | C2 | 10 | 34 | 167 | 219 |
| | | C3 | 10 | 34 | 167 | 220 |
| | | C4 | 10 | 34 | 167 | 221 |

FIG. 3

| MODEM | | TRX | MODEM | | TRX |
|---|---|---|---|---|---|
| MODEM1 [MDE1] | - | C1 [TRX GROUP1,IP-TRX1] | MODEM1 [MDE3] | - | C1 [TRX GROUP3,IP-TRX1] |
| MODEM2 [MDE1] | - | C2 [TRX GROUP1,IP-TRX1] | MODEM2 [MDE3] | - | C2 [TRX GROUP3,IP-TRX1] |
| MODEM3 [MDE1] | - | C3 [TRX GROUP1,IP-TRX1] | MODEM3 [MDE3] | - | C3 [TRX GROUP3,IP-TRX1] |
| MODEM4 [MDE1] | - | C4 [TRX GROUP1,IP-TRX1] | MODEM4 [MDE3] | - | C4 [TRX GROUP3,IP-TRX1] |
| MODEM5 [MDE1] | - | C1 [TRX GROUP1,IP-TRX2] | MODEM5 [MDE3] | - | C1 [TRX GROUP3,IP-TRX2] |
| MODEM6 [MDE1] | - | C2 [TRX GROUP1,IP-TRX2] | MODEM6 [MDE3] | - | C2 [TRX GROUP3,IP-TRX2] |
| MODEM7 [MDE1] | - | C3 [TRX GROUP1,IP-TRX2] | MODEM7 [MDE3] | - | C3 [TRX GROUP3,IP-TRX2] |
| MODEM8 [MDE1] | - | C4 [TRX GROUP1,IP-TRX2] | MODEM8 [MDE3] | - | C4 [TRX GROUP3,IP-TRX2] |
| MODEM9 [MDE1] | - | C1 [TRX GROUP1,IP-TRX3] | MODEM9 [MDE3] | - | C1 [TRX GROUP3,IP-TRX3] |
| MODEM10 [MDE1] | - | C2 [TRX GROUP1,IP-TRX3] | MODEM10 [MDE3] | - | C2 [TRX GROUP3,IP-TRX3] |
| MODEM11 [MDE1] | - | C3 [TRX GROUP1,IP-TRX3] | MODEM11 [MDE3] | - | C3 [TRX GROUP3,IP-TRX3] |
| MODEM12 [MDE1] | - | C4 [TRX GROUP1,IP-TRX3] | MODEM12 [MDE3] | - | C4 [TRX GROUP3,IP-TRX3] |
| MODEM13 [MDE1] | - | C1 [TRX GROUP1,IP-TRX4] | MODEM13 [MDE3] | - | C1 [TRX GROUP3,IP-TRX4] |
| MODEM14 [MDE1] | - | C2 [TRX GROUP1,IP-TRX4] | MODEM14 [MDE3] | - | C2 [TRX GROUP3,IP-TRX4] |
| MODEM15 [MDE1] | - | C3 [TRX GROUP1,IP-TRX4] | MODEM15 [MDE3] | - | C3 [TRX GROUP3,IP-TRX4] |
| MODEM16 [MDE1] | - | C4 [TRX GROUP1,IP-TRX4] | MODEM16 [MDE3] | - | C4 [TRX GROUP3,IP-TRX4] |
| MODEM17 [MDE1] | - | C1 [TRX GROUP1,IP-TRX5] | MODEM17 [MDE3] | - | C1 [TRX GROUP3,IP-TRX5] |
| MODEM18 [MDE1] | - | C2 [TRX GROUP1,IP-TRX5] | MODEM18 [MDE3] | - | C2 [TRX GROUP3,IP-TRX5] |
| MODEM19 [MDE1] | - | C3 [TRX GROUP1,IP-TRX5] | MODEM19 [MDE3] | - | C3 [TRX GROUP3,IP-TRX5] |
| MODEM20 [MDE1] | - | C4 [TRX GROUP1,IP-TRX5] | MODEM20 [MDE3] | - | C4 [TRX GROUP3,IP-TRX5] |
| MODEM21 [MDE1] | - | C1 [TRX GROUP1,IP-TRX6] | MODEM21 [MDE3] | - | C1 [TRX GROUP3,IP-TRX6] |
| MODEM22 [MDE1] | - | C2 [TRX GROUP1,IP-TRX6] | MODEM22 [MDE3] | - | C2 [TRX GROUP3,IP-TRX6] |
| MODEM23 [MDE1] | - | C3 [TRX GROUP1,IP-TRX6] | MODEM23 [MDE3] | - | C3 [TRX GROUP3,IP-TRX6] |
| MODEM24 [MDE1] | - | C4 [TRX GROUP1,IP-TRX6] | MODEM24 [MDE3] | - | C4 [TRX GROUP3,IP-TRX6] |

| MODEM | | TRX | MODEM | | TRX |
|---|---|---|---|---|---|
| MODEM1 [MDE2] | - | C1 [TRX GROUP2,IP-TRX1] | MODEM1 [MDE4] | - | C1 [TRX GROUP4,IP-TRX1] |
| MODEM2 [MDE2] | - | C2 [TRX GROUP2,IP-TRX1] | MODEM2 [MDE4] | - | C2 [TRX GROUP4,IP-TRX1] |
| MODEM3 [MDE2] | - | C3 [TRX GROUP2,IP-TRX1] | MODEM3 [MDE4] | - | C3 [TRX GROUP4,IP-TRX1] |
| MODEM4 [MDE2] | - | C4 [TRX GROUP2,IP-TRX1] | MODEM4 [MDE4] | - | C4 [TRX GROUP4,IP-TRX1] |
| MODEM5 [MDE2] | - | C1 [TRX GROUP2,IP-TRX2] | MODEM5 [MDE4] | - | C1 [TRX GROUP4,IP-TRX2] |
| MODEM6 [MDE2] | - | C2 [TRX GROUP2,IP-TRX2] | MODEM6 [MDE4] | - | C2 [TRX GROUP4,IP-TRX2] |
| MODEM7 [MDE2] | - | C3 [TRX GROUP2,IP-TRX2] | MODEM7 [MDE4] | - | C3 [TRX GROUP4,IP-TRX2] |
| MODEM8 [MDE2] | - | C4 [TRX GROUP2,IP-TRX2] | MODEM8 [MDE4] | - | C4 [TRX GROUP4,IP-TRX2] |
| MODEM9 [MDE2] | - | C1 [TRX GROUP2,IP-TRX3] | MODEM9 [MDE4] | - | C1 [TRX GROUP4,IP-TRX3] |
| MODEM10 [MDE2] | - | C2 [TRX GROUP2,IP-TRX3] | MODEM10 [MDE4] | - | C2 [TRX GROUP4,IP-TRX3] |
| MODEM11 [MDE2] | - | C3 [TRX GROUP2,IP-TRX3] | MODEM11 [MDE4] | - | C3 [TRX GROUP4,IP-TRX3] |
| MODEM12 [MDE2] | - | C4 [TRX GROUP2,IP-TRX3] | MODEM12 [MDE4] | - | C4 [TRX GROUP4,IP-TRX3] |
| MODEM13 [MDE2] | - | C1 [TRX GROUP2,IP-TRX4] | MODEM13 [MDE4] | - | C1 [TRX GROUP4,IP-TRX4] |
| MODEM14 [MDE2] | - | C2 [TRX GROUP2,IP-TRX4] | MODEM14 [MDE4] | - | C2 [TRX GROUP4,IP-TRX4] |
| MODEM15 [MDE2] | - | C3 [TRX GROUP2,IP-TRX4] | MODEM15 [MDE4] | - | C3 [TRX GROUP4,IP-TRX4] |
| MODEM16 [MDE2] | - | C4 [TRX GROUP2,IP-TRX4] | MODEM16 [MDE4] | - | C4 [TRX GROUP4,IP-TRX4] |
| MODEM17 [MDE2] | - | C1 [TRX GROUP2,IP-TRX5] | MODEM17 [MDE4] | - | C1 [TRX GROUP4,IP-TRX5] |
| MODEM18 [MDE2] | - | C2 [TRX GROUP2,IP-TRX5] | MODEM18 [MDE4] | - | C2 [TRX GROUP4,IP-TRX5] |
| MODEM19 [MDE2] | - | C3 [TRX GROUP2,IP-TRX5] | MODEM19 [MDE4] | - | C3 [TRX GROUP4,IP-TRX5] |
| MODEM20 [MDE2] | - | C4 [TRX GROUP2,IP-TRX5] | MODEM20 [MDE4] | - | C4 [TRX GROUP4,IP-TRX5] |
| MODEM21 [MDE2] | - | C1 [TRX GROUP2,IP-TRX6] | MODEM21 [MDE4] | - | C1 [TRX GROUP4,IP-TRX6] |
| MODEM22 [MDE2] | - | C2 [TRX GROUP2,IP-TRX6] | MODEM22 [MDE4] | - | C2 [TRX GROUP4,IP-TRX6] |
| MODEM23 [MDE2] | - | C3 [TRX GROUP2,IP-TRX6] | MODEM23 [MDE4] | - | C3 [TRX GROUP4,IP-TRX6] |
| MODEM24 [MDE2] | - | C4 [TRX GROUP2,IP-TRX6] | MODEM24 [MDE4] | - | C4 [TRX GROUP4,IP-TRX6] |

F I G. 4

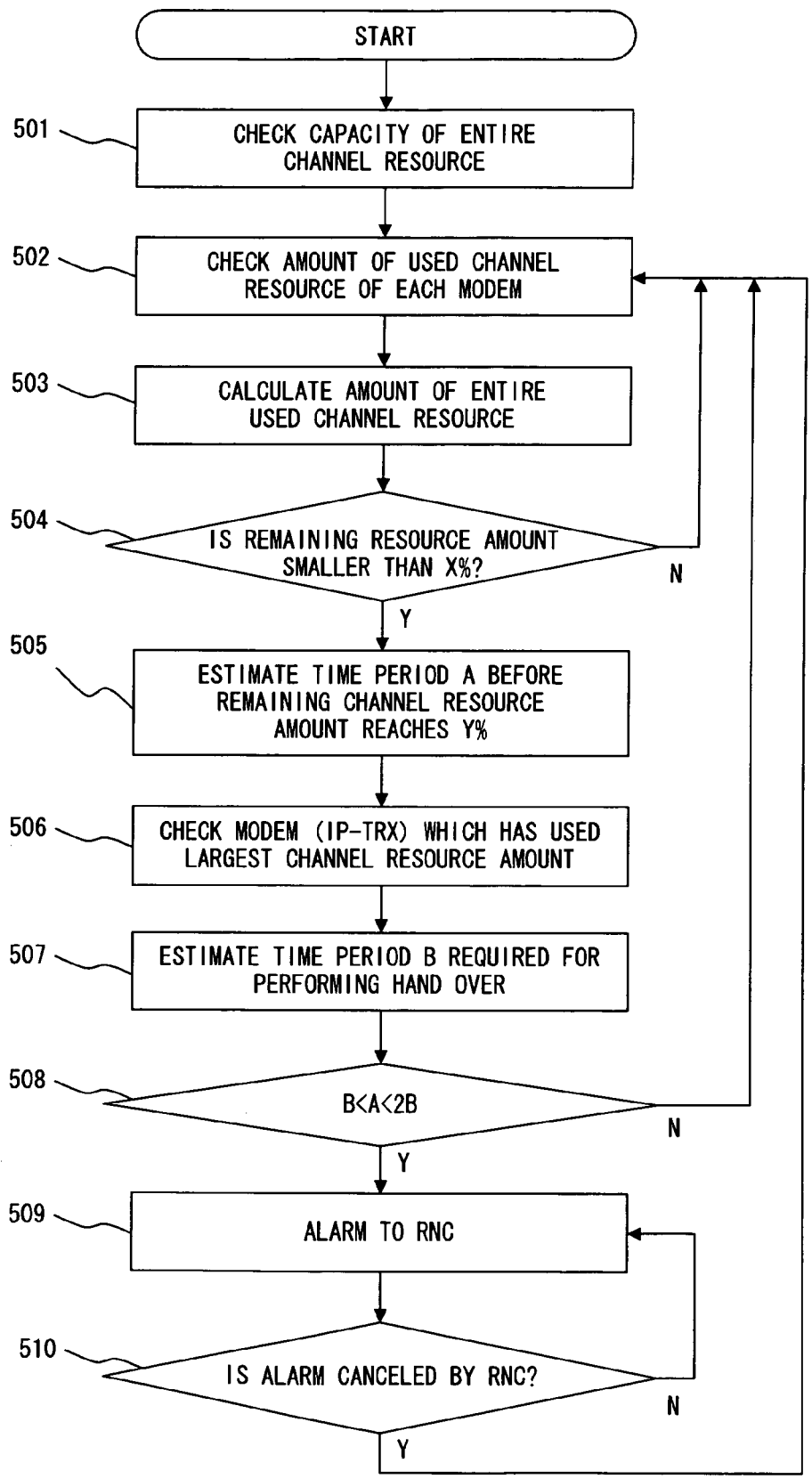
F I G. 5

SIGNAL PROCESSING SYSTEM IN WIRELESS MOBILE COMMUNICATION SYSTEM

BACKGROUND OF THE INVENTION

1. Field of the Invention

The present invention relates to a signal processing system for processing a signal received from a mobile station, and a signal transmitted to the mobile station in wireless mobile communication systems including a GSM (Global System for Mobile Communications), a W-CDMA (Wideband-Code Division Multiple Access) system and the like.

2. Description of the Related Art

As connection configurations of a radio network controller (RNC) and a base transceiver station (BTS) in conventional mobile phone systems, one of the configurations of FIG. 1A through FIG. 1C has been selected and employed.

In the connection configuration of FIG. 1A, m number of BTSs BTS1 through BTSm are connected to an RNC 11 via an ATM (Asynchronous Transfer Mode) network 12. Each BTS comprises antennas (ANTs) 21-1 through 21-6, transmission/reception units (Transceivers) TRX1 through TRX6, a control unit (CP) 22, a surveillance unit (SV) 23, a base band unit (BB) 24, and an interface (I/F) 25. Each transmission/reception unit comprises a transmission unit (TX), a reception unit (RX), and a power amplifier (PA). The base band unit 24 comprises n number of base band signal processing units BB1 through BBn.

Each antenna 21-$i$ ($i=1, 2, \ldots, 6$) can transmit and receive four carrier signals C1 through C4 (of frequencies f1 through f4). Each carrier signal can use the maximum number of channels in the wireless mobile communication system of the GSM, W-CDMA or the like. Each base band signal processing unit performs base band signal processes in units of channels.

In the connection configuration of FIG. 1B, the BTSs BTS1 through BTSm are connected to an RNC 31 via an IP (Internet Protocol) network 32. Each BTS employs the configuration in which the interface 25 is replaced with an interface 33 in the configuration of FIG. 1A.

In the connection configuration of FIG. 1C, the BTSs BTS1 through BTSm are connected to the RNC 11 via the ATM network 12 similarly to the configuration of FIG. 1A. Each BTS employs the configuration in which the antennas 21-1 through 21-6 and the transmission/reception units TRX1 through TRX6 are removed from the configuration of FIG. 1, and is connected to the transmission/reception units TRX1 through TRX6 via an optical network 41.

The Patent Document 1 below discloses a technique of load distribution performed by causing the ATM network used by a wireless access network in a W-CDMA communication system to have functions of IP network.

Patent Document 1

Japan Patent Application Publication No. 2004-048209

The conventional connection configurations described above have the difference just of connection method between the base band unit and the transmission/reception unit i.e., the difference whether they are connected by the electrical connection or by the optical connection. Thus, in any of the above configurations, the channel resource capacity (the number of the channels) in units of antennas is limited by the number "n" of the base band signal processing units provided in the BTS. Accordingly, when there are connection requests from the mobile stations in the larger number than the presumed channel resource capacity, communications with some of the mobile stations have to be disconnected because of lack of resource.

SUMMARY OF THE INVENTION

It is an object of the present invention to reduce a probability of a communication disconnection due to lack of channel resource of a BTS in a wireless mobile communication system.

A signal processing system according to the present invention comprises a plurality of transmission/reception devices and a plurality of signal processing devices, and processes signals received from mobile stations and signals transmitted to the mobile stations in the wireless mobile communication system.

Each transmission/reception device comprises an interface and a change device, and transmits and receives radio frequency signals to/from a plurality of mobile stations. Each signal processing device performs base band signal processes of a plurality of channels. The interface transmits and receives base band signals to/from each of the plurality of signal processing devices via a communication network. The change device changes a connection destination to/from which the base band signal of the target mobile station is transmitted and received, from a first signal processing device to a second signal processing device.

BRIEF DESCRIPTION OF THE DRAWINGS

FIG. 3 shows IP addresses;

FIG. 4 shows connections between signal processing devices and transmission/reception devices;

FIG. 5 is a flowchart of a resource surveillance process; and

DESCRIPTION OF THE PREFERRED EMBODIMENTS

Figure 1A:
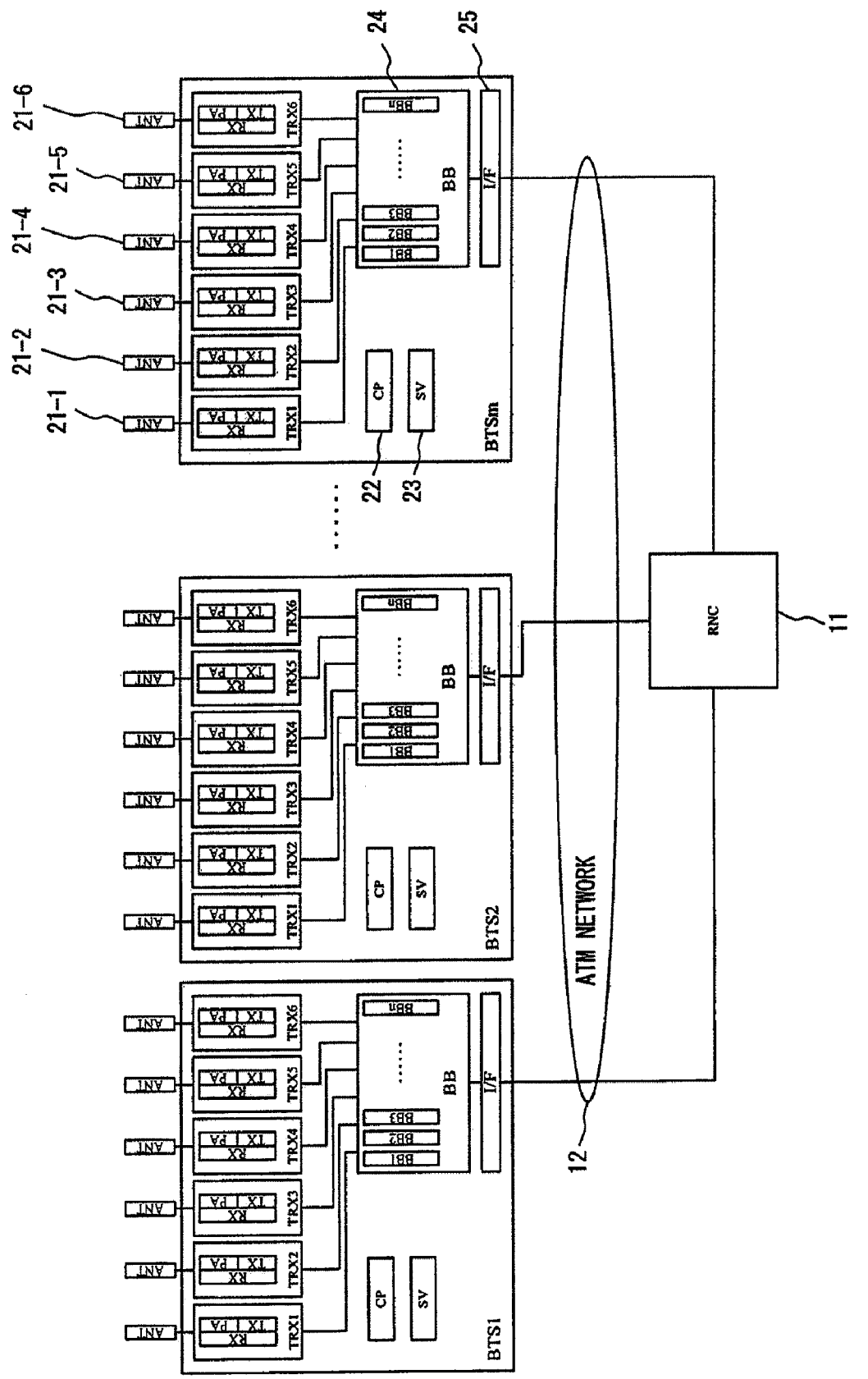
FIG. 1A shows the first conventional connection configuration.
Figure 1B:
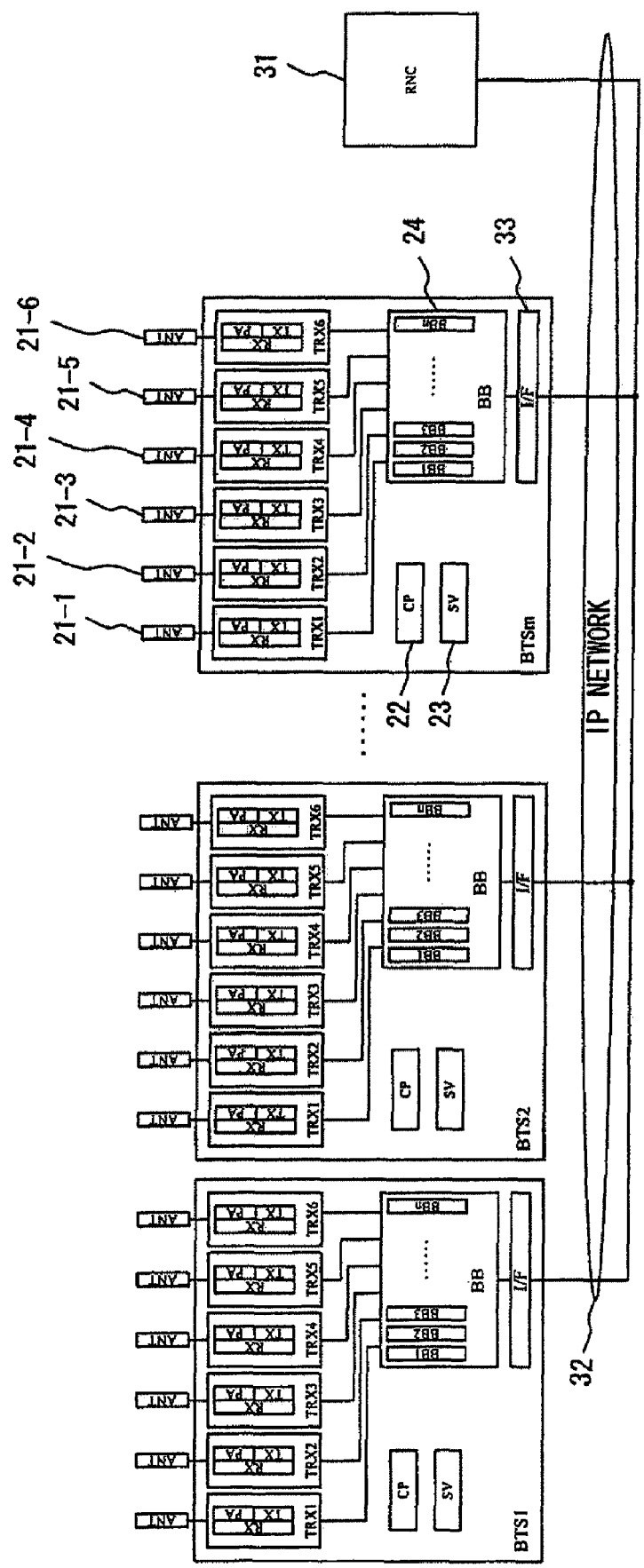
FIG. 1B shows the second conventional connection configuration.
Figure 1C:
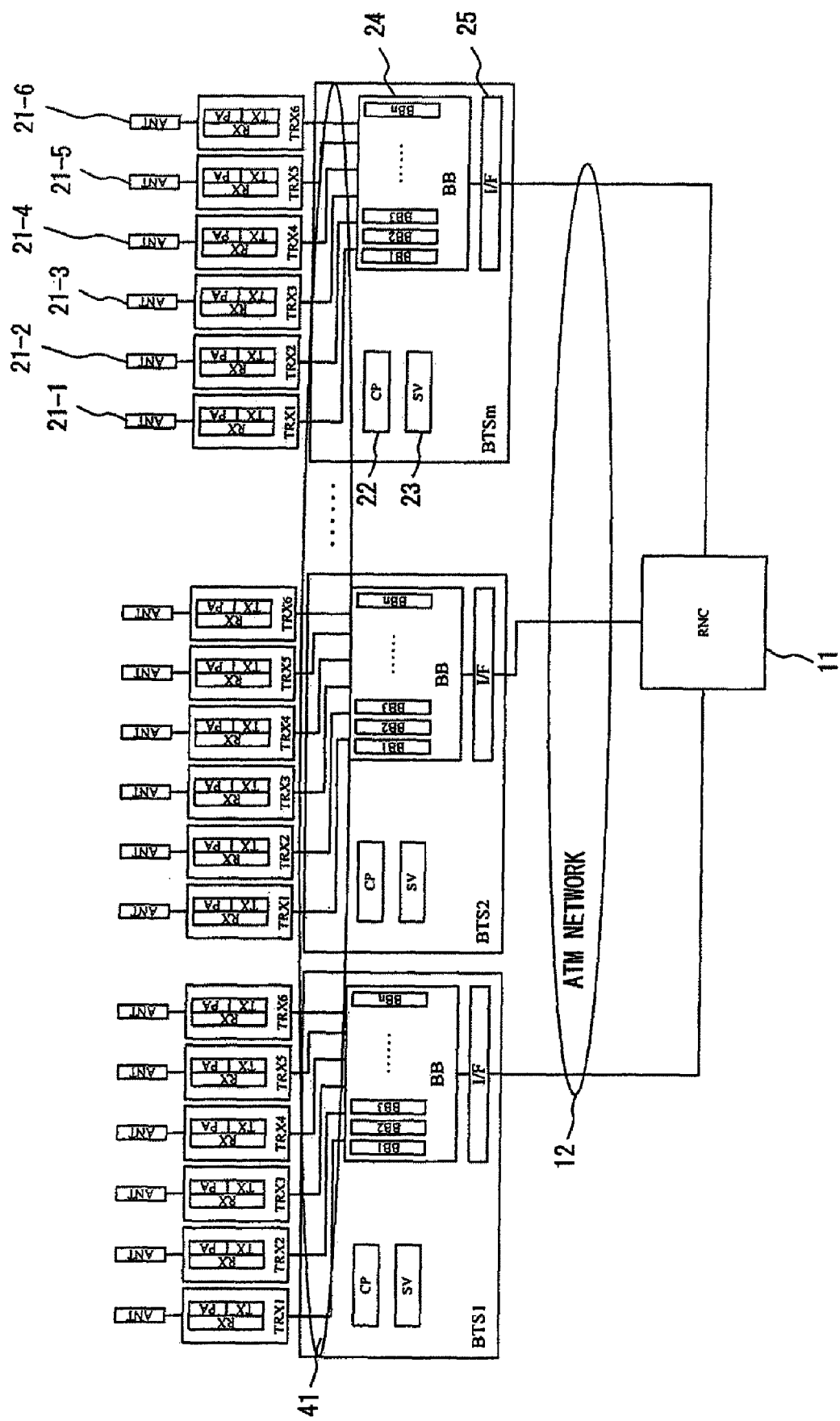
FIG. 1C shows the third conventional connection configuration.

Hereinafter, the most preferred embodiments of the present invention will be explained in detail, by referring to the drawings.

Figure 2A:
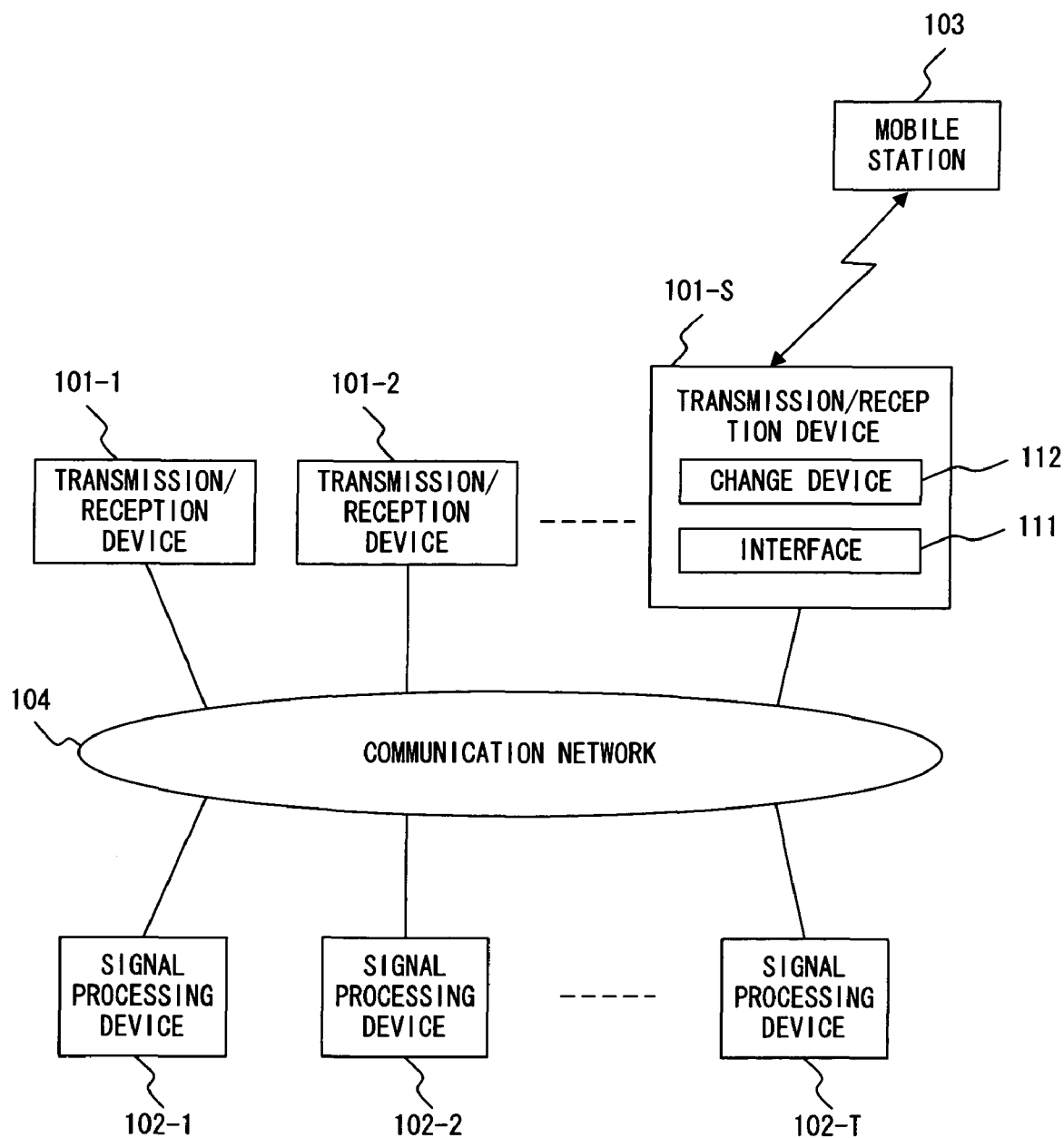
FIG. 2A shows a principle of a signal processing system according to the present invention.

FIG. 2A shows a principle of a signal processing system according to the present invention. The signal processing system of FIG. 2A comprises S number of transmission/reception devices 101-1 through 101-S, T number of signal processing devices 102-1 through 102-T in order to process signals received from mobile stations and signals transmitted to the mobile stations in a wireless mobile communication system.

Each transmission/reception device 101-$s$ ($s=1, 2, \ldots, S$) comprises an interface 111 and a change device 112 in order to transmit and receive radio frequency signals to/from a plurality of mobile stations. Each signal processing device 102-$t$ ($t=1, 2, \ldots, T$) performs base band signal processes of a plurality of channels.

The interface 111 transmits and receives base band signals to/from each of the signal processing devices 102-1 through 102-T via a communication network 104. The change device 112 changes a connection destination from the first signal processing device to the second signal processing device among the signal processing devices 102-1 through 102-T. The connection destination is the destination to/from which the base band signal of the target mobile station 103 is transmitted and received.

It is assumed that the transmission/reception device 101-S transmits and receives the radio frequency signals to/from the target mobile station 103, and the base band signals of the communications are transmitted and received to/from the first signal processing device. In this situation, when the ratio of the remaining channel resource amount to the entire channel resource amount in the first signal processing device becomes lower than a prescribed value for example, the change device 112 changes the connection destination that transmits and receives the base band signals of the target mobile station 103 from the first signal processing device to the second signal processing device.

The transmission/reception device 101-s corresponds, for example, to an antenna 211-i and an IP-TRXi (i=1, 2 . . . , 6) of FIG. 2B which will be explained later. The signal processing device 102-t corresponds, for example, to an MDEj (j=1, 2, 3, 4) of FIG. 2B. The communication network 104 corresponds, for example, to an IP network 202 of FIG. 2B. The interface 111 corresponds, for example, to an IPI/F in the IP-TRXi. The change device 112 corresponds, for example, to an IPI/F and an SV in the IP-TRXi.

According to the present invention, the functions that a conventional BTS has had are divided into transmission/reception devices for communicating with the mobile stations and a signal processing device for performing the base band signal processes, and a plurality of the transmission/reception devices and a plurality of signal processing devices are connected via the communication network. Thereby, the connection relationships between the base band units and the transmission/reception units which have been inflexibly set can be changed flexibly.

Accordingly, the connection relationship can be changed from the combination of the signal processing device and the transmission/reception device that suffers from lack of the channel resource to the combination of the signal processing device and the transmission/reception device that has surplus of the channel resource, thereby, it is possible to reduce the probability of disconnection of communication with mobile stations caused by the lack of resource.

Figure 2B:
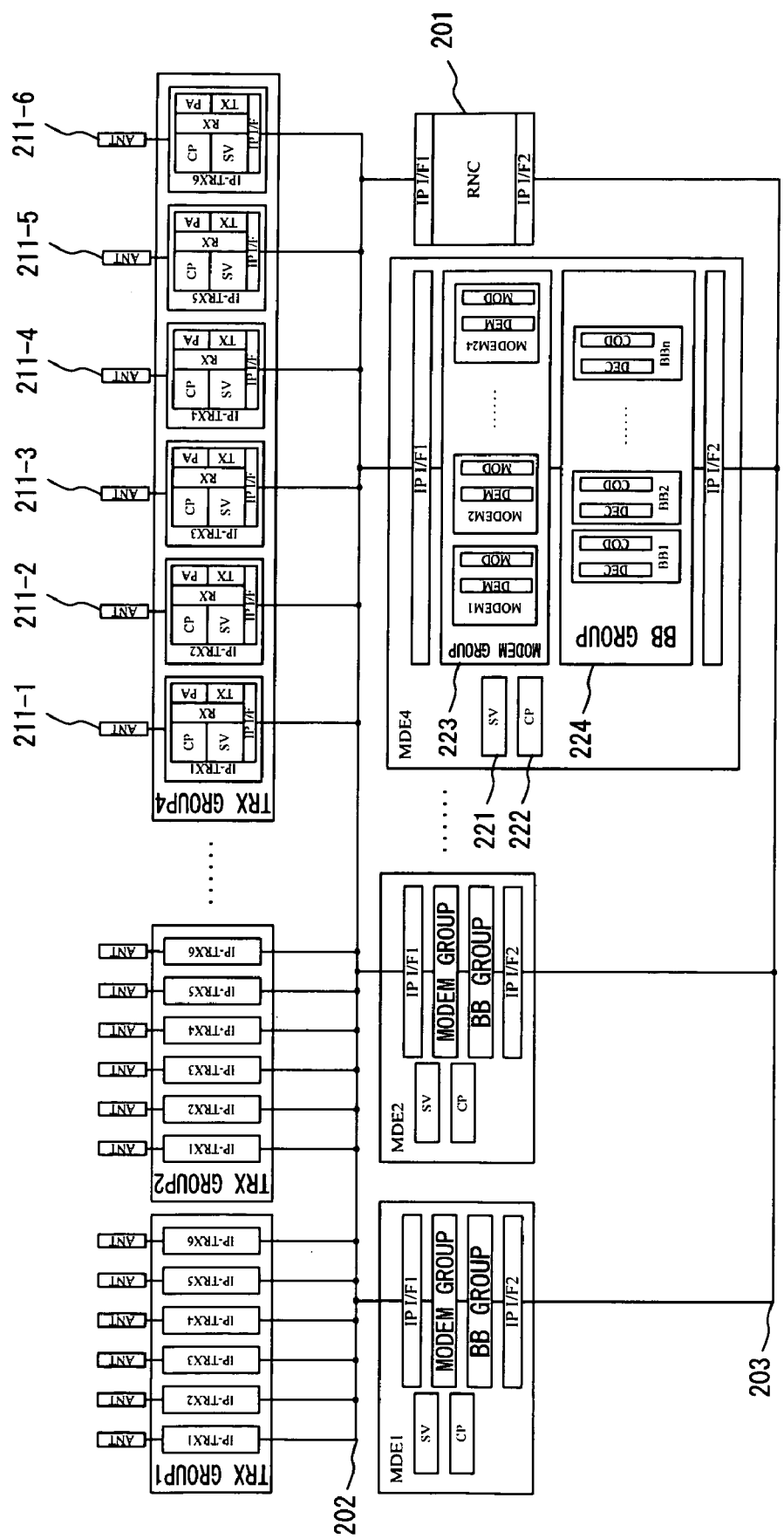
FIG. 2B shows a connection configuration of the present invention.

FIG. 2B shows a connection configuration example according to the present embodiment in a wireless mobile communication system such as a GSM, a W-CDMA system or the like. In this connection configuration, four signal processing devices MDE1 through MDE4 are connected to an RNC 201 via an IP network 203, and are connected to TRX group1 through TRX group4 via an IP network 202.

The RNC 201 comprises two IP interfaces of IPI/F1 and IPI/F2. The RNC 201 is connected to the IP network 202 via the IPI/F1, and is connected to the IP network 203 via the IPI/F2.

Each TRX group j (j=1, 2, 3, 4) comprises six transmission/reception units IP-TRX1 through IP-TRX6. Each transmission/reception unit IP-TRXi (i=1, 2, . . . , 6) comprises a control unit (CP), a surveillance unit (SV), a transmission unit (TX), a reception unit (RX), a power amplifier (PA), and an IP interface (IPI/F), and is connected to antenna 211-i.

The TX converts the base band signals from the MDE1 through MDE4 from digital to analog, thereafter, converts the signals into transmission signals in a radio frequency (RF) band. The PA amplifies the transmission signals and outputs the transmission signals to antenna 211-i. The RX detects a received signal from the antenna 211-i, converts the signal from analog to digital, and outputs the base band signal to the MDE1 through MDE4. The CP controls operations of the entire IP-TRXi. The SV monitors operation status of the IP-TRXi.

The antenna 211-i and the transmission/reception unit IP-TRXi constitute the i-th transmission/reception device. Each antenna 211-i can transmit and receive four carrier signals C1 through C4 (of frequencies f1 through f4), and each carrier signal can use the maximum number of channels in the wireless mobile communication system of the GSM, the W-CDMA system or the like.

Each signal processing device MDEj (j=1, 2, 3, 4) comprises a surveillance unit (SV) 221, a control unit (CP) 222, a MODEM group 223, a BB group 224, and two interfaces of the IPI/F1 and the IPI/F2. Each signal processing device MDEj is connected to the IP network 202 via the IPI/F1, and is connected to the IP network 203 via the IPI/F2.

The MODEM group 223 comprises twenty four modulation/demodulation units MODEM1 through MODEM24. The BB group 224 comprises n number of base band signal processing units BB1 through BBn. The number "n" of the base band signal processing units may vary corresponding to each MDEj.

Each modulation/demodulation unit MODEMk (k=1, 2, . . . , 24) includes a modulator (MOD) and a demodulator (DEM). The MOD modulates and multiplexes the base band signals of a plurality of channels from the BB group 224, and the DEM demodulates and demultiplexes the base band signals from the TRX group1 through TRX group4.

Each base band signal processing unit BBp (p=1, 2, . . . , n) includes a coder (COD) and a decoder (DEC), and performs a base band signal processes in units of channels. For example, in the case of a CDMA system, the COD performs spreading and the like on the transmission signal, and the DEC performs despreading and the like on the received signal.

The control unit 222 controls the operations of the entire MDEj, and the surveillance unit 221 monitors the operation status of the MDEj.

The number of the TRX groupj or the number of the MDEj does not have to be four. Further, the number of the TRX groupj does not have to be the same as that of the MDEj. Also, the number of the IP-TRXi in the TRX groupj does not have to be six, and the number of the MODEMk in the MODEM group 223 does not have to be twenty four.

FIG. 3 shows an example of assigning IP addresses in the IP network 202 of FIG. 2B. In this example, IPv4 which is currently prevailing is used. A single IP address is assigned to the RNC. In each MDEj, IP addresses are assigned respectively to the CP/SV and each MODEMk. In each TRX groupj, IP addresses are assigned respectively to the CP/SV and the carrier signals C1 through C4 of each IP-TRXi.

FIG. 4 shows a connection example between the MDE1 through MDE4 and the TRX group1 through the TRX group4 in the IP network 202. In this example, the MODEM1 through the MODEM4 of the MDEj respectively process the carrier signals C1 through C4 of the IP-TRX1 belonging to the TRX groupj. Similarly, the MODEM5 through the MODEM24 of the MDEj respectively process the carrier signals C1 through C4 of the IP-TRX2 through IP-TRX6 belonging to the TRX groupj.

Next, the operations of each IP-TRXi and each MDEj in the wireless mobile communication system of FIG. 2B are explained in more detail. The normal operations of the IP-TRXi are as below.

1) Before connecting the IP-TRXi to the IP network 202, an operator inputs the number of necessary IP addresses and the respective IP addresses to the IP-TRXi through a local operation.

2) After the operator connects the IP-TRXi to the IP network 202, and turns on the power of the IP-TRXi, the IP-TRXi communicates with the RNC 201.

3) The RNC 201 notifies the IP-TRXi of the MDEj that should be connected and the IP address of the MODEMk of the MDEj, and also notifies the MDEj as the connection destination of the IP address of the IP-TRXi which is to be newly connected, while confirming the number of the IP addresses of the IP-TRXi which has started communication to the RNC 201, the number of the MODEM not in use in the connected MDEj, and the use situation of the resource of the BB group 224.

4) After the notification, the CP 222 and the SV 221 in the MDEj communicate with the CP and the SV of the connected IP-TRXi, and controls and monitors the IP-TRXi.

5) For example, when the IP-TRX1 and the MDE1 are connected as shown in FIG. 4, data in the IP network 202 is communicated as below.

(1) From MODEM1[MED1] to C1[TRX group1, IP-TRX1]: Downstream I (in phase) data and Q (quadrature) data (2) From C1[TRX group1, IP-TRX1] to MODEM1 [MDE1]: Upstream I data and Q data, and total received power value data (3) Among CP/SV[MDE1], CP/SV[IP-TRX1], and RNC: Error information, alarm information, and control information of each device 6) The upstream data received by the MDEj is decoded in the BB group 224, and transferred to the RNC 201 via the IP network 203. The downstream data transferred to MDEj from the RNC 201 is encoded in the BB group 224, and transferred to the IP-TRXi.

Figure 6:
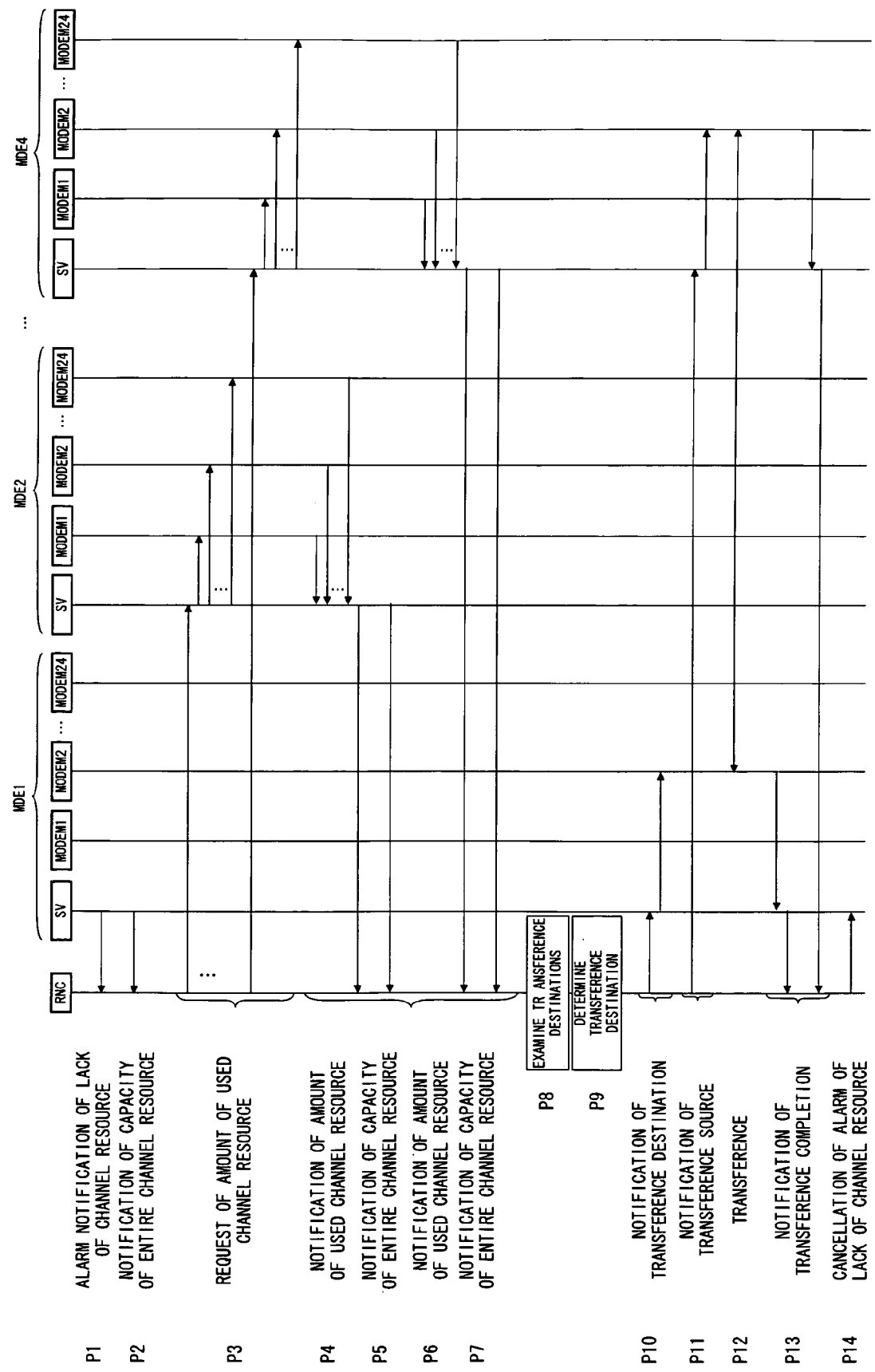
FIG. 6 shows a hand over sequence.

Next, operations performed in the case of lack of the channel resource in the MDEj are explained, by referring to FIG. 5 and FIG. 6.

FIG. 5 is a flowchart of a resource surveillance process by the SV 221 of the MDEj. First, the SV 221 checks capacity of the entire channel resource of the BB group 224 (step S501), and checks the amount of the used channel resource of each MODEMk (step S502). Here, the capacity of the entire channel resource represents the number "n" of the BBs belonging to the BB group 224, and the amount of the used channel resource represents the number of the BBs used by the MODEMk.

Next, the sum of the amount of the used channel resource of the MODEM1 through MODEM24 is calculated in order to obtain the amount of the entire used channel resource of the BB group 224 (step 503), and compares the amount of the entire used channel resource with the capacity of the entire channel resource (step 504). If the remaining channel resource amount is equal to or larger than X % (fifty percent, for example) of the capacity of the entire channel resource, the processes of and subsequent to the step 502 are repeated.

When the remaining channel resource amount becomes smaller than X % of the entire channel resource, an estimated time period A before the remaining channel resource amount reaches Y % (ten percent, for example) is calculated by a method of moving average or the like (step 505). Also, by comparing amounts of used channel resource among the MODEM1 through the MODEM24, the MODEMk which has used the largest amount of the channel resource is determined, and the carrier signal Cr (r=1, 2, 3, 4) of the IP-TRXi processed by the determined MODEMk is determined (step 506).

Then, while taking the current data rate and the like into account, an estimated time period B required for performing a hand over of the carrier signal is calculated (step 507), and A is compared with B, and is also compared with the double of B (2B) (step 508).

When A is equal to or smaller than B, it is estimated that the remaining channel resource amount decreases to Y % before the hand over is completed, and when A is equal to or larger than 2B, it is recognized that there is a large amount of resource that can be used until the remaining channel resource amount decreases to Y %. Therefore, in these cases it is determined that the hand over do not have to be conducted, and the process of and subsequent to the step 502 are repeated.

To the contrary, when A is larger than B, and also smaller than 2B, it is determined that the hand over has to be conducted, and an alarm is transmitted to the RNC 201, meaning that the remaining channel resource is to lack (step 509). Then, it is checked whether or not the notice of cancellation of the alarm has been received from the RNC 201 (step 510). If the notice has been received, the process of and subsequent to the step 502 are repeated.

In the step 508, predetermined time periods may be employed as the threshold values instead of B and 2B respectively.

FIG. 6 shows a hand over sequence in the case that the alarm of lack of the channel resource is transmitted from the MDE1 to the RNC 201. The procedure of the hand over in this case is as below.

P1: The SV 221 of the MDE1 notifies the RNC 201 of the alarm of lack of the channel resource, and request the hand over. Upon this notification, the SV 221 notifies the RNC 201 of the IP address of the MODEMk which has used the largest amount of the channel resource, the IP address of the connection destination thereof for the carrier signal, and the amount of the used channel resource, as transference source information.

For example, when the MODEM2 has used the largest amount of the channel resource, the RNC 201 is notified of the IP address "10.34.167.4" of the MODEM2, the IP address "10.34.167.104" of the IP-TRX1 for the carrier signal C2 belonging to the TRX group1, and the amount of the channel resource used by the MODEM2.

P2: The SV 221 of the MDE1 notifies the RNC 201 of the capacity of the entire channel resource of the MDE1.

P3: The RNC 201 determines that the remaining channel resource amount of the MDE1 has become Y % of the entirety, and requests the SV 221 of each of the MDE2 through the MDE4 which are transference destination candidates to investigate the amount of its used channel resource. The SV 221 of each MDEj, being requested, inquires the amount of the used channel resource of each of the MODEM1 thorough the MODEM24.

P4: Each of the MODEM1 through the MODEM24 of the MDE2 notifies the SV 221 of the amount of its used channel resource. The SV 221 notifies the RNC 201 of the sum of the amounts of the used channel resource of the MODEM1 through the MODEM24 as the amount of the entire used channel resource.

The SV 221 notifies the RNC 201 of the IP address of the MODEMk which is the transference destination candidate and the IP address of the connection destination for the carrier signal.

P5: The SV 221 of the MDE2 notifies the RNC 201 of the capacity of the entire channel resource of the MDE2.

The MEE3 also notifies of the RNC 201 of the amount of the entire used channel resource, the capacity of the entire channel resource, the IP address of the MODEMk, and the IP address for the carrier signal.

P6: Each of the MODEM1 through the MODEM24 of the MDE4 notifies the SV 221 of the amount of its used channel resource. The SV 221 notifies the RNC 201 of the sum of the amounts of the used channel resource of the MODEM1 through the MODEM24 as the amount of the entire used channel resource.

The SV 221 notifies the RNC 201 of the IP address of the MODEMk which is the transference destination candidate and the IP address of the connection destination for the carrier signal.

In this example, the RNC 201 is notified of the IP address "10.34.167.79" of the MODEM2, and the IP address "10.34.167.194" of the IP-TRX1 for the carrier signal C2 belonging to the TRX group4.

P7: The SV 221 of the MDE4 notifies the RNC 201 of the capacity of the entire channel resource of the MDE4.

P8: The RNC 201 examines transference destination candidates based on the transference source information of which the RNC 201 was notified by the MDE1, the amount of the entire used channel resource/the capacity of the entire channel resource of which the RNC 201 was notified by the MDE2 through the MDE4. Upon this, the amount of the used channel resource of the transfer target information is added to the amount of the entire used channel resource of each MDEj, and it is checked whether or not the remaining channel resource amount is equal to or larger than Z % (forty percent, for example) of the capacity of the entire channel resource.

P9: The RNC 201 determines the MDEj whose remaining channel resource amount is equal to or larger than Z % to be the transference destination. In this example, the MDE4 is determined to be the transference destination.

P10: The RNC 201 notifies, of the IP address for the carrier signal obtained from the transference destination, the SV 221 of the MDE1 which is the transference source, as the IP address of the reconnection destination. The SV 221 notifies the MODEM2, which is the transference source, of that IP address.

The RNC 201 also notifies the SV of the IP-TRXi as the connection destination of the transference source, of the IP address of the MODEMk obtained from the transference destination, as the IP address of the reconnection destination. The SV notifies the IPI/F of that IP address.

Thereby, the MODEM2 of the MDE1 is notified of the IP address "10.34.167.194" for the carrier signal obtained from the MDE4, and the IPI/F of the IP-TRX1 of the TRX group1 is notified of the IP address "10.34.167.79" of the MODEM2 obtained from the MDE4.

P11: The RNC 201 notifies, of the IP address for the carrier signal obtained from the transference source, the SV 221 of the MDE4 which is the transference destination, as the IP address of the reconnection destination. The SV 221 notifies the MODEM2, which is the transference destination, of that IP address.

The RNC 201 notifies the SV of the IP-TRXi as the connection destination of the transference destination, of the IP address of the MODEMk obtained from the transference source, as the IP address of the reconnection destination, and the SV notifies the IPI/F of that IP address.

Thereby, the MODEM2 of the MDE4 is notified of the IP address "10.34.167.104" for the carrier signal obtained from the MDE1, and the IPI/F of the IP-TRX1 of the TRX group4 is notified of the IP address "10.34.167.4" of the MODEM2 obtained from the MDE1.

P12: The MODEM2 of the MDE1, the MODEM2 of the MDE4, the IP-TRX1 of the TRX group1, and the IP-TRX1 of the TRX group4 perform the transference of the carrier signals.

Thereby, the connection destination of the carrier signal C2 of the IP-TRX1 belonging to the TRX group1 is changed from the MODEM2 of the MDE1 to the MODEM2 of the MDE4, and the connection destination for the carrier signal C2 of the IP-TRX1 belonging to the TRX group4 is changed from the MODEM2 of the MDE4 to the MODEM2 of the MDE1.

P13: The MODEM2 of the MDE1 notifies the SV 221 of the completion of the transference, and the SV 221 notifies the RNC 201 of the completion of the transference. The MODEM2 of the MDE4 notifies the SV 221 of the completion of the transference, and the SV 221 notifies the RNC 201 of the completion of the transference.

P14: The RNC 201 notifies the SV 221 of the MDE1 of the cancellation of the alarm of lack of the channel resource.

In the above sequence of the hand over, when the MDEj whose remaining channel resource amount is equal to or larger than Z % is not found, and the transference of the connection destination can not be performed, the SV 221 of the MDE1 as the transference source and the SV of the IP-TRX1 of the TRX group1 display alarm messages on the devices, and notify the RNC 201 of the alarm.

When another error or alarm occurs within a single IP-TRXi, the SV of the IP-TRXi displays the error message or the alarm message on the device, and notifies the SV of the MDEj as the connection destination of the contents of the error or the alarm. The SV of the MDEj, having being notified of these, notifies the RNC 201 of the identification information of the corresponding IP-TRXi and the contents of the error or the alarm.

What is claimed is:

1. A signal processing system for processing signals received from mobile stations and signals transmitted to the mobile stations in a wireless mobile communication system, comprising:
   a plurality of transmission/reception devices each of which transmits and receives radio frequency signals of a plurality of mobile stations; and
   a plurality of signal processing devices configured to process signals received and transmitted from and to the plurality of mobile stations, wherein
   each of the transmission/reception devices comprises:
   an interface configured to transmit and receive base band signals to and from each of the plurality of signal processing devices via a communication network; and
   a first change device configured to change a connection destination to and from which base band signals of a target mobile station are transmitted and received, from a first signal processing device to a second signal processing device among the plurality of signal processing devices, each of the plurality of signal processing devices comprises:
an interface configured to transmit and receive, via a communication network, base band signals to and from the plurality of transmission/reception devices;
a base band signal processing device configured to execute base band signal processes of a plurality of channels;
a second change device configured to change a connection destination to and from which process target base band signals are transmitted and received, from a first transmission/reception device to a second transmission/reception device among the plurality of transmission/reception devices; and
a surveillance device configured to monitor an amount of used channel resource of the base band signal processing device, and to output an alarm when a ratio of a remaining channel resource amount to a capacity of entire channel resource becomes lower than a prescribed value, the surveillance device calculates an estimated time period before the ratio of the remaining channel resource amount reaches a specific value when the ratio of the remaining channel resource amount becomes lower than the prescribed value, and outputs the alarm when the estimated time period is longer than a time period required for changing the connection destination and is shorter than a prescribed time period, and the second change device changes the connection destination to and from which the process target base band signals are transmitted and received when the alarm is output.

2. A signal processing device for processing signals received from mobile stations and signals transmitted to the mobile stations in a wireless mobile communication system, comprising:
an interface configured to transmit and receive, via a communication network, base band signals to and from a plurality of transmission/reception devices each of which transmits and receives radio frequency signals of a plurality of mobile stations;
a base band signal processing device configured to execute base band signal processes of a plurality of channels;
a change device configured to change a connection destination to and from which process target base band signals are transmitted and received, from a first transmission/reception device to a second transmission/reception device among the plurality of transmission/reception devices; and
a surveillance device configured to monitor an amount of used channel resource of the base band signal processing device, and to output an alarm when a ratio of a remaining channel resource amount to a capacity of entire channel resource becomes lower than a prescribed value, wherein the surveillance device calculates an estimated time period before the ratio of the remaining channel resource amount reaches a specific value when the ratio of the remaining channel resource amount becomes lower than the prescribed value, and outputs the alarm when the estimated time period is longer than a time period required for changing the connection destination and is shorter than a prescribed time period, and the change device changes the connection destination to and from which the process target base band signals are transmitted and received when the alarm is output.

3. A signal processing method of processing signals received from mobile stations and signals transmitted to the mobile stations in a wireless mobile communication system, the signal processing method comprising:
transmitting and receiving, via a communication network, base band signals to and from a plurality of transmission/reception devices each of which transmits and receives radio frequency signals of a plurality of mobile stations;
executing base band signal processes of a plurality of channels using a base band signal processing device;
monitoring an amount of used channel resource of the base band signal processing device;
calculating an estimated time period before a ratio of a remaining channel resource amount to a capacity of entire channel resource reaches a specific value when the ratio of the remaining channel resource amount becomes lower than a prescribed value;
outputting an alarm when the estimated time period is longer than a time period required for changing a connection destination to and from which process target base band signals are transmitted and received, from a first transmission/reception device to a second transmission/reception device among the plurality of transmission/reception devices, and the estimated time period is shorter than a prescribed time period; and
changing the connection destination from the first transmission/reception device to the second transmission/reception device when the alarm is output.

* * * * *